3,580,764
MANUFACTURE OF BODIES FROM A BUNDLE OF BONDED RESIN TUBES
Fritz Gerlach, Weil am Rhein, Toni Hauskrecht, Haltingen, and Hermann Holch, Lorrach, Germany, assignors to Lonza-Werke GmbH, Weil am Rhein, Germany
No Drawing. Filed July 5, 1967, Ser. No. 651,138
Claims priority, application Switzerland, July 5, 1966, 9,764/66
Int. Cl. B32b *31/14*
U.S. Cl. 156—83            6 Claims

ABSTRACT OF THE DISCLOSURE

Parallel substantially rigid resin tubes are assembled to a bundle in which the tubes are mechanically held together; the bundle is then subjected to a treatment which swells and softens the contacting surfaces of the tubes whereby the tubes are bonded together under the pressure developed by the swelling action. Finally, the bundle is dried under said pressure while the tubes are still mechanically held together, and then the bundle is removed as a coherent body from the holding means.

---

This invention relates to a method for the manufacture of bodies from laminated joined plastic tubes.

Bodies of this type are, e.g., boards, panels or plates in which all the plastic tubes extend in the direction of the thickness, width, or length of the body, or multilayer articles, in which the directions of the axes of the tubes may differ from layer to layer. However, such bodies may have any other spatial form, and they may be provided at their outer faces with cover plates.

Several methods are known to join the tubes in such bodies to each other. They may be coated with an adhesive and then arranged in layers, or they may be first so arranged and the adhesive may be forced by capillary action into the interstices between the tubes, or the piled up tubes may be heated to be superficially welded together.

All these methods have certain drawbacks.

The first mentioned method is complicated and time consuming and produces uneven results because, while the tubes are being stacked, part of the adhesive may harden on the already stacked tubes; this interferes with the uniform junction of the tubes when the assembly is subsequently placed under pressure. When capillary action is employed, the adhesive can penetrate only along a rather short length between the tubes. In the welding method, it is difficult to maintain a constant temperature in the entire assembly.

It is also known to press the coated tubes together in directions which are perpendicular to the direction of the axes and with respect to each other while the adhesive hardens during the welding operation. In this way, a honeycomb structure is formed. The parallel tubes assume a hexagonal cross section when the bundle is compressed by about 10% in every of the recited directions. (The diameter of the inner circle of a regular hexagon is about 0.9 times the diameter of a circle of the same circumference.) After the adhesive has hardened or at fusion subsequent to the solidification of the plastic, the hexagonal cross section remains because the parts of the tube envelopes which have been pressed flat to prismatic faces, are joined to each other.

Said pressure is applied by means of pressure plates, or it may be produced by closing the tubes at both ends and heating them to softening so as to widen them by the increasing internal pressure. In this operation, the temperature is critical and closure of the tubes is difficult.

It is a principal object of the invention to provide a simpler method for joining the rigid plastic tubes of a tube assembly.

Other objects and advantages will become apparent on consideration of the following description and claims.

In accordance with the invention, the assembled tubes are treated with an agent which wets the plastic and has thereon a swelling and dissolving action; the tube assembly is then dried under the pressure produced by the swelling of the plastic.

If said wetting, swelling, and dissolving agent is a liquid, the tube assembly is dipped for a short time into said liquid and the excess of adhering liquid is removed before the assembly is dried.

The swellable plastic tubes have preferably a diameter of about 2–8 mm., a length between 2 and 50 cm., and a wall thickness of 0.08 to 0.25 mm. All tubes used for an assembly should have the same diameter and the same wall thickness. This uniformity is of great importance for the manufacture of homogeneous bodies; otherwise, the treatment with the swelling agent would cause variable deformations which would result in products of reduced strength.

Suitable swellable resins suitable as material of the tubes are, e.g., cellulose acetate, polyvinylchloride, polyesters, polysulfones (tradename for the polycondensation products of 2,2 - (4,4' - dihydroxydiphenyl) - dimethylmethane and dihydroxy diphenyl sulfone), polyphenyloxides (tradename for the thermoplastic resins obtained by oxidative coupling of 2,6-dimethylphenol), polyimides, and polyamides. In accordance with their future use, the tubes may contain, or be coated with, a flameproofing composition.

The swelling agent must have swelling and dissolving properties for the material of the tubes so as to enlarge their cross section by swelling. In some cases, it may be of advantage if the agent contains a suitable plasticizer for the resin. The agent must be capable of wetting the respective resin and, if a liquid, must have a sufficiently low viscosity to enter the interstices between the assembled tubes. Preferably, said liquid is sufficiently volatile to allow quick drying of the assembly after the excess of liquid has been removed and the tubes have been bonded together. It is also possible to have the swelling and dissolving agent in the gaseous state on the tube assembly.

In order to produce the laminated bodies, the tubes are first assembled to bundles. For this purpose, the tubes may be placed in the desired arrangement in a supporting device which is preferably a basket; in order to obtain the tightest assembly, the packing is done preferably under shaking.

After the supporting device has been closed, it is immersed into the liquid swelling agent so as to allow the same of entering all cavities. After a sufficient contact time, the excess liquid is completely removed, e.g., by blowing, shaking, centrifuging, and subsequently the entire assemblage is dried; thereby, care must be taken to avoid unequal drying which would cause in the body stresses resulting in deformations.

The pressure produced inside the body by the swelling action can be increased by external pressure.

The bodies prepared by the method of the invention can be cut by conventional tools to any desired shape.

The holding device may have various forms; it is only important that it prevents squeezing or crushing of the tubes at the supported areas due to insufficient size of the contact surfaces and ensures a complete penetration of the liquid or gas into all parts of the tube bundle. The device may also enclose the bundle under mechanical, e.g., spring pressure, which can follow form variations due to swelling or shrinking while maintaining the pressure.

The extent of the bonded areas of the tubes depends on the intensity of the swelling action of the fluid and the contact time; it ranges from a junction along the contacting surfaces of the tubes for small swelling pressures to the most advantageous planar bond between tubes of hexagonal cross section produced from the round tubes by a stronger swelling pressure. For tubes of cellulose acetate, the following liquids have been found to be of particular advantage: Diacetone-alcohol, mixtures of ethyl alcohol and dimethyl phthalate in proportions e.g. of 50:50 to 100:50, isopropyl alcohol and diethyl phthalate in proportion of e.g. 60:40 to 50:50, mixtures of dimethyl acetal, methanol and trichloroethyl phosphate in proportions of e.g. 80:20:10 to 80:20:20. The contact times are preferably 5 to 10 seconds at room temperature.

The following example is given to illustrate but not to limit the invention.

EXAMPLE

Small cellulose acetate tubes of 20 cam length, and 3.2 mm. diameter, having a well thickness of 0.08 mm., are placed parallel in contact with each other into a holding device in form of a basket, size 100·50·20 cm., disposed in a shaking apparatus. After the basket has been evenly filled and closed, it is dipped at room temperature for 10 seconds into a mixture of 60 parts of isopropyl alcohol and 40 parts of dimethyl phthalate. Then the basket with the bundle of wet parallel tubes is centrifuged to remove excess liquid; the wet tube bundle is dried in a current of air first at room temperature for 15 minutes and then at 60° C., and then taken out of the basket. A honeycombed body is obtained in which the tubes have a hexagonal cross section and are joined without interstices.

For tubes of rigid polyvinyl chloride, a suitable liquid is a mixture of 65 percent by weight of methylisobutyl ketone, 20 percent by weight of ethyl acetal, and 15 percent by weight of dibutyl phthalate. A suitable immersion time is 15 to 20 seconds, and the drying temperature should be about 60° C.

A suitable liquid for polycarbonate tubes is a mixture of 90 percent by weight of methylisobutyl ketone and 10 percent by weight of dimethyl phthalate, whereby the dip time is 10 to 15 seconds, and the drying temperature about 100° C.

Tubes of polysulfones are preferably treated with a mixture of 75 percent by weight of methylglycol acetate, 15 percent by weight of acetone, and 10 percent by weight of diethylphthalate; the dip time is 10 to 15 seconds and the drying temperature about 100° C.

For polystyrene tubes, a suitable liquid is a mixture of 40 percent by weight of benzene, 40 percent by weight of ethanol, and 20 percent by weight of dibutyl phthalate; dip time is 10 seconds and drying temperature about 80° C.

Such honeycomb bodies are suitable, for instance, as core material for very stable light weight boards for building and construction applications.

We claim:

1. A method of preparing a coherent body comprised of a plurality of essentially paralled plastic tubes which are bonded together along their entire length wherever two of said tubes contact each other, from a plurality of essentially parallel plastic tubes which comprises:
    (a) confining a plurality of said plastic tubes to a predetermined shape selected for said coherent body, by confining said plastic tubes within a predetermined confined space, said plurality of said plastic tubes not being subjected to any external pressure emanating from outside of said confinred space, said plastic tubes being essentially parallel to each other, all of said plastic tubes having essentially the same diameter and essentially the same wall thickness, and said plastic tubes being made of a material selected from the group consisting of cellulose acetate, polyimides and polyamides;
    (b) contacting the confined said plastic tubes with a fluid capable of swelling and softening said material, and bonding said tubes to each other along the entire length where any two of said two tubes contacts each other, whereby said plastic tubes are bonded into said coherent body by pressure of a portion of the softened exterior surface of each of said plastic tubes against said adjacent plastic tubes, said pressure being caused by the swelling of said plastic tubes, said contact being conducted for at least enough time for said swelling and softening agent to enter all of the cavities resulting from said plastic tubes.
    (c) removing any excess of said swelling and softening agent;
    (d) drying said coherent body while it is still subjected to said pressure; and
    (e) removing said coherent body comprised of said plurality of said essentially parallel plastic tubes which have been bonded together along their entire length wherever two of said tubes contact each other, from said confirmed space.

2. A method as described in claim 1 wherein said fluid is a liquid, said liquid having a sufficiently low viscosity so as to enable it to enter the interstices between said plastic tubes, said liquid wetting said plastic tubes and liquid containing 0 to 50 percent by weight of a plasticizer.

3. A method as described in claim 1 wherein each of said plastic tubes have been compressed prior to said removal and drying steps, so that each of said tubes have a hexagonal cross section.

4. A method as described in claim 1 wherein said swelling and softening agent is selected from the group consisting of diacetone-alcohol; mixtures of ethyl alcohol and dimethyl phthalate; mixtures of isopropyl alcohol and diethyl phthalate, mixtures of dimethyl acetal, methanol and trichloroethyl phosphate in proportions, mixtures of methylisobutyl ketone, ethyl acetal, and dibutyl phthalate; methylisobutyl ketone, dimethyl phthalate; methylglycol acetate, acetone, and diethylphthalate; and mixtures of benzene, ethanol, dibutyl phthalate.

5. A method as described in claim 1 wherein said plastic tubes have a diameter of about 2 to 8 mm., a length between 2 and 50 cm., and a wall thickness of 0.08 to 0.25 mm.

6. A method as described in claim 1 wherein said fluid is a gas.

References Cited

UNITED STATES PATENTS

| | | | |
|---|---|---|---|
| 1,396,159 | 11/1921 | Bowers | 156—83 |
| 1,888,402 | 11/1932 | Weingaud | 156—83 |
| 2,920,934 | 1/1960 | Schaefer et al. | 8—130.1 |
| 3,291,561 | 12/1966 | Abashian | 8—130.1 |

LELAND A. SEBASTIAN, Primary Examiner

S. R. HELLMAN, Assistant Examiner

U.S. Cl. X.R.

156—296